United States Patent
Britt

(10) Patent No.: US 6,675,209 B1
(45) Date of Patent: Jan. 6, 2004

(54) METHOD AND SYSTEM FOR ASSIGNING PRIORITY AMONG NETWORK SEGMENTS

(75) Inventor: Steven V. Britt, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/356,477

(22) Filed: Jul. 19, 1999

(51) Int. Cl.[7] .............................................. G06F 13/00
(52) U.S. Cl. ...................................................... 709/224
(58) Field of Search ................................. 709/223, 224, 709/225, 229

(56) References Cited

U.S. PATENT DOCUMENTS 5,237,695 A * 8/1993 Skokan et al. ............... 709/225
5,539,659 A * 7/1996 McKee et al. ............... 709/224

\* cited by examiner

Primary Examiner—Robert B. Harrell
(74) Attorney, Agent, or Firm—David M. Mason

(57) ABSTRACT

This invention specifies a mechanism that can be used by network management system ("NMS") applications, running on a single workstation or personal computer, which continuously monitor the flow of traffic on some or all segments of their attached network. The invention enables an application to determine whether enough system resources are available to monitor all segments in the network. If not all of the segments can be monitored, the invention specifies an algorithm that can be used to intelligently select a subset of segments for monitoring. If all of the segments can be monitored the same algorithm may instead be applied to determine which segments should be monitored at a more detailed level than the rest. In effect, this invention will allow one application running on a workstation or personal computer to monitor networks that range in size from one to several thousand segments while consuming a bounded portion of its host system's resources. This not only allows the same NTAS application to be marketed to a wider spectrum of customers, but permits the application to adapt its function to a much broader set of conditions as the network being monitored evolves over time.

36 Claims, 8 Drawing Sheets

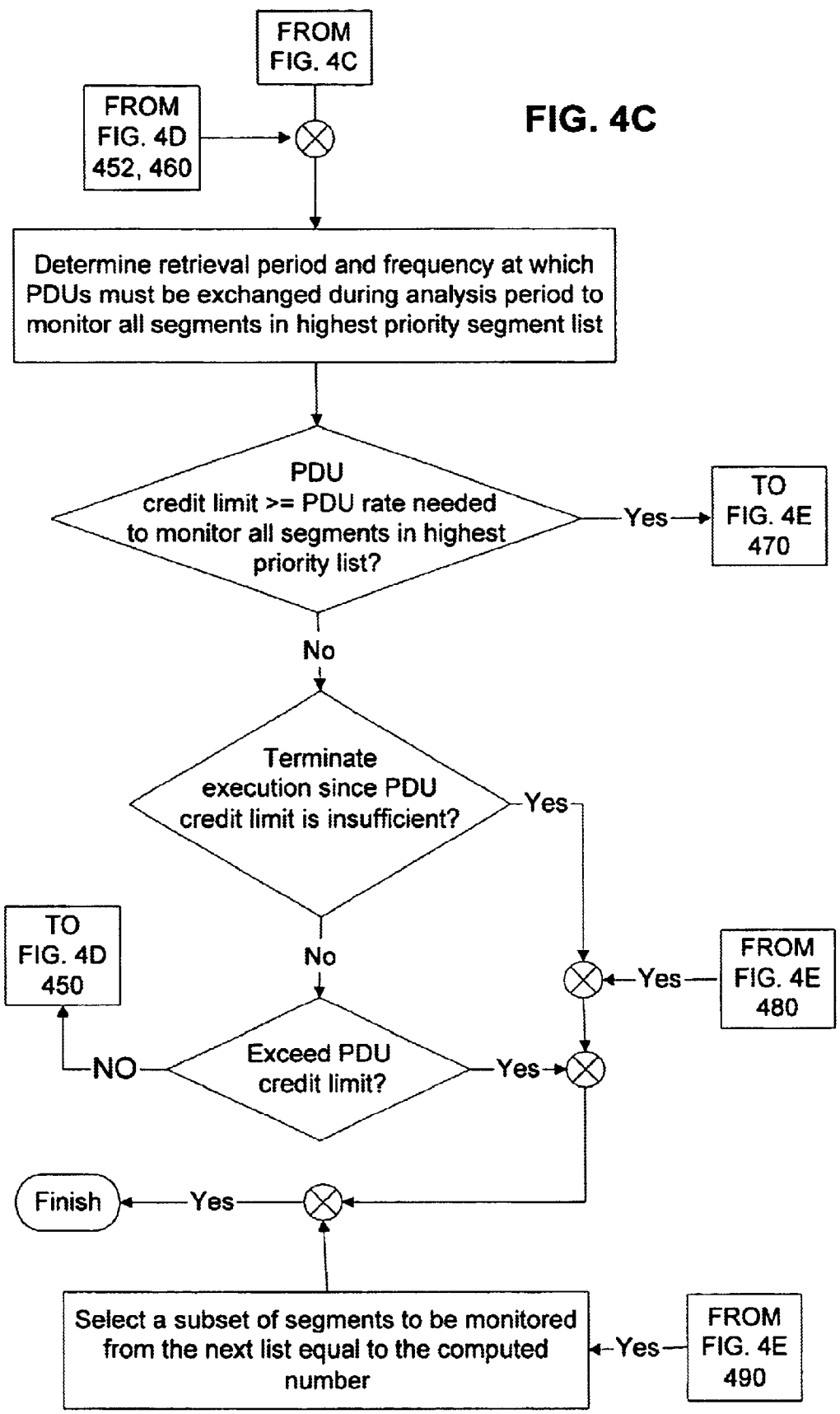

METHOD AND SYSTEM FOR ASSIGNING PRIORITY AMONG NETWORK SEGMENTS

BACKGROUND OF THE INVENTION

1. Field of the Invention

This invention relates in general to a system for managing network traffic, and more particularly to a process and assembly for prioritizing the segments of a computer network according to their importance to help predict future network problems without jeopardizing host system resources.

2. Description of the Related Art

In the early 1990s and before, most of the world's networks consisted of shared media Ethernet. Such networks were built using hubs that attached to end nodes. Bridges and routers separated groups of hubs into smaller areas of shared media known as collision domains, or segments. A typical network contained multiple segments, and the bandwidth of each segment was in turn shared by multiple nodes that contended with one another when they had data to transmit. As the number of nodes contending for a segment's bandwidth increased, the average period that each node had to wait before transmitting its data lengthened, and each host waited for exclusive access to the shared media.

In the late 1990s the availability of network switching solutions at commodity prices prompted customers to partition their computer networks into increasingly smaller pockets of shared media, using switches to connect the shared-media pockets. Switching reduces the potential for bandwidth contention by isolating the devices attached to a switch port from one another. Each switch port bounds a segment, just as bridges and routers did before.

Single nodes or groups of nodes may be attached to a switch port to define a segment. A node, as described herein, can be any element of a network other than the network bus itself. For example, a node could include a computer, printer, modem, scanner, repeater, bridge, hub, router, etc. Each node as described, may repeatably receive, transmit, and/or transfer a volume or unit of data or traffic information.

Attaching a group of nodes to a switch effectively isolates those nodes from all others in the network. In other words, the devices on a switch port only hear traffic destined specifically for them. The isolated nodes must contend with the switch and with one another for network bandwidth, but do not have to contend with nodes elsewhere in the network. Attaching a single node to a switch isolates that node so that it has only to contend with the switch for network bandwidth when it needs to transmit data.

Building a network infrastructure that isolates most or all of the network's end nodes onto their own switch ports is often referred to as micro-segmenting, a practice that results in increased network availability and effectively more bandwidth for the end nodes. Micro-segmenting comes at an expense. The more heavily a network is segmented the more difficult, time consuming, and expensive it is for a network administrator to manage effectively due to the increased number of segments in the topology.

Most network administrators rely on one or more network management system ("NMS") applications to assist them in monitoring and controlling their network's operation. In all but the simplest networks, a critical function of an NMS is to monitor and control the flow of traffic within the network.

Networks evolve in many different ways over time: the number and type of devices used in the network infrastructure changes, the number and type of end nodes change, and the data exchanged by the end nodes change. Even the type and speed of media used in the network can evolve as technology improves. Without monitoring the flow of traffic in such a network it would be impossible to determine whether a network continues to function properly over time except in extreme cases where it becomes non-operational.

Monitoring the flow of traffic in a network allows NMS applications to build databases that describe which nodes are conversing on the network's segments, which nodes are exchanging information with each other over time, and the type and volume of traffic being generated by each node. Such databases may in turn be used by other applications that perform a wide range of functions such as billing users for network bandwidth consumption, predicting future bandwidth requirements, and troubleshooting long-term or infrequently occurring problems. Continuous traffic monitoring can also be used as a real-time method for detecting when the network is inaccessible so that the network administrator can be alerted to outages or other problems that inhibit the network's function.

Prior Solutions and their Disadvantages

A conventional network management system ("NMS") that continuously monitors traffic supports data acquisition methods that utilize dedicated probe devices such as RMON or RMON-II. This type of NMS runs continuously in the sense that on the segments where probes reside, the probes continually gather, analyze and store detailed traffic information on that segment. The software applications that retrieve and display such information to the user may or may not run continually; if they do, it is to receive notification from a probe that collected data about a network activity is worthy of inspection by the administrator.

The cost and complexity of the above solution usually prevents an administrator from monitoring every segment in their network even when equipped with infrastructure devices (hubs, switches, and routers) that implement RMON internally. Consequently, most administrators that utilize an NMS that continuously monitors network traffic can only monitor business-critical portions of their networks.

Other NMS applications take advantage of simple numeric counters that are available in almost all infrastructure devices. Industry-standard specifications, called management information bases ("MIBs"), dictate which numeric counters a device should keep and what types of occurrences should be counted. Several MIBs specify counters for different types of network traffic, and virtually every networking infrastructure device implements one or more of these MIBs. Monitoring systems that rely on such counters normally consist of a software application that executes on a workstation or personal computer.

The user is required to select a segment from those listed by the application, specify which MIB counters are to be monitored on the segment, and give a frequency with which the counter values should be retrieved. Then the application periodically retrieves the specified counter values from the segment until monitoring is terminated at the user's request. Some applications support this type of counter retrieval on several segments simultaneously. This type of application usually runs only upon user demand, and the set of counters retrieved by it is almost always variable depending upon user configuration.

The monitoring applications described above each have different strengths and weaknesses. The detailed monitoring mechanism first described is too costly for most network administrators to implement everywhere in their networks. The volume of detailed data that results is overwhelming to analyze, and most of the collected data would hold relatively little importance to them—such information is usually analyzed only after an anomalous condition is detected on a segment and a diagnosis is required.

The second system, a less detailed approach to network monitoring, relies on the retrieval of standardized counter values. Although this system is within the budget of almost every network administrator and may detect problem conditions on a segment, it usually cannot obtain the type of detailed information needed to determine whether a problem really exists and subsequently provide a diagnosis of the problem's cause.

Both types of NMS applications usually limit the number of segments that data can be retrieved from the network at any one time without regard to the type of host system they are executing on. Consequently, when the resources of a host system vary, so do the reliability and function of the monitoring applications.

The present invention is directed to overcoming, or at least reducing the effects of, one or more of the problems set forth above.

SUMMARY OF THE INVENTION

This invention provides an operational adapter for a network management system ("NMS") running on a host computer. The inventive network traffic analysis system ("NTAS") systematically prioritizes the nodes of a network for collecting basic and/or detailed network traffic information. More specifically, if traffic information can not be collected from all network nodes, the NTAS application provides an algorithm that can be used to intelligently select a subset of segments for monitoring that will accommodate the host system resources. If the host system resources will allow for the collection of basic traffic information from all of the segments then the same algorithm can determine which segments should be monitored at a more detailed level than the rest. In effect, this invention will allow a conventional NMS, running on a workstation or personal computer, to monitor networks that range in size from one to several thousand segments while consuming a bounded portion of its host system's resources. In turn, this invention will allow a conventional NMS to dynamically alter the traffic information that it will collect as the network conditions change over time.

In one aspect of the present invention, an adaptive system module interacts with an NMS to dynamically determine what network traffic information should be collected and stored for analysis. The module and NMS application are operable on a host computer being coupled to a network having multiple segments that may utilize various data acquisition methods. The adaptive system module includes a network organizer that categorizes the multiple segments of the network, a network prioritizer that ranks the categorized segments amongst themselves according to a necessity to obtain data traffic information for analysis, and a system optimizer that determines how many of the ranked segments can provide data traffic information within a set protocol data unit ("PDU") credit limit.

In another aspect of the instant invention, an adaptive system module interacts with an NMS application to provide a method that can determine what network traffic information should be collected and stored for analysis by a network management system. The module and system are operable on a host computer being coupled to a network having multiple segments that may utilize various data acquisition methods. The method includes steps of categorizing the multiple segments of the network, ranking the categorized segments amongst themselves according to a necessity to obtain data traffic information for analysis, and determining how many of the ranked segments can provide data traffic information within a PDU credit limit.

BRIEF DESCRIPTION OF THE DRAWINGS

Other aspects and advantages of the invention will become apparent upon reading the following detailed description and upon reference to the drawings, in which:

FIGS. 4A, 4B, 4C, 4D, and 4E provide a detailed flow chart that expands on the concepts of FIG. 3 to illustrate other functional embodiments of the process.

Figure 1:
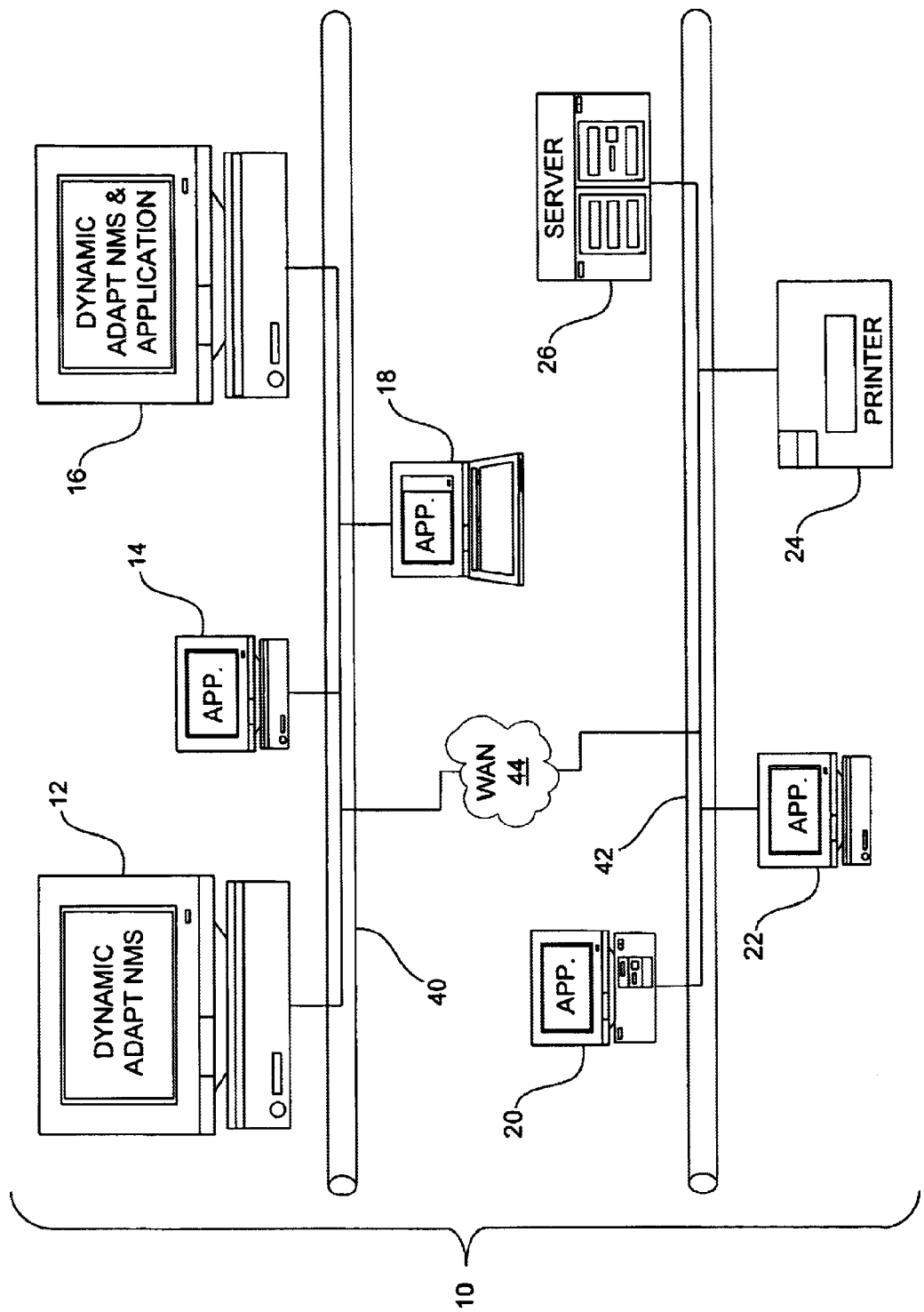
FIG. 1 illustrates a block diagram of an enterprise network in which the methods and structures of the present invention are advantageously applied.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In general, the present invention provides a system that can monitor the flow of traffic throughout a network topology. More specifically, the present invention provides an adaptive module that can interact with a conventional network management system ("NMS") to select a specific subset of the network from which to extract detailed traffic measurements while also gathering simpler measurements everywhere. The collected traffic measurements may come from network topologies that range in size from one segment to several thousand segments while only consuming a bounded amount of the host computer system's resources. Hereinafter, the inventive adaptive module combined with a conventional NMS will be referenced as a network traffic analysis system ("NTAS") application.

Referring now to the drawings, FIG. 1 illustrates a block diagram of an exemplary enterprise network environment 10 in which the methods and structures of the present invention are advantageously applied. A plurality of host systems 12–22 and node devices 24–26 is interconnected via networking segments 40 and 42. Networking segments 40 and 42 are, in turn, interconnected via wide area network 44.

Those skilled in the relevant arts will readily recognize that the networking topology of FIG. 1 is intended merely as exemplary of a wide variety of networking topologies in which an NTAS application is utilized. For example, simpler topologies in which all of the computing system's nodes are interconnected via a single networking segment may advantageously apply the techniques and structure of the present invention. In a like manner, more complex topologies utilizing a plurality of wide area networks interconnecting in a large number of networking segments where each segment may be itself subdivided into sub-segments, etc. may also advantageously apply the techniques and structures of the present invention.

As shown in the network enterprise environment 10 of FIG. 1, nodes 14 and 18 through 22 are operable to perform particular dedicated application programs useful in the enterprise. Nodes 24 and 26 represent network communication devices, such as a printer and a server, respectively, coupled to the network for all application programs to utilize.

Nodes 12 and 16 include NTAS application functions that dynamically adapt their operation to the particular computing environment of their respective host systems. In particular, node 12 is dedicated to the NTAS application functions operable thereon. By contrast, node 16 includes NTAS application functions operable thereon in accordance with the present invention and co-operable on the computing node 16 with other enterprise applications.

The NTAS applications gather data from other nodes of the network to provide the requested management functions. For example, a network administrator at node 12 may request information regarding status of applications operable on node 22. Such information is gathered by the exchange of data units that are specific to network management protocols. Cooperating processes on each of node 12 and 22, for example, permit the network manager at node 12 to gather, analyze and display such network data. Such protocol data units are often referred to as packets. However, use of the term "packet" may cause the reader to improperly limit the application of the present invention to communication media and protocols that are "packet oriented". Though perhaps more cumbersome, the term protocol data units ("PDU") will be used herein to refer to the exchanged traffic between an NTAS application and other nodes of the enterprise network.

System of Invention

Figure 2:
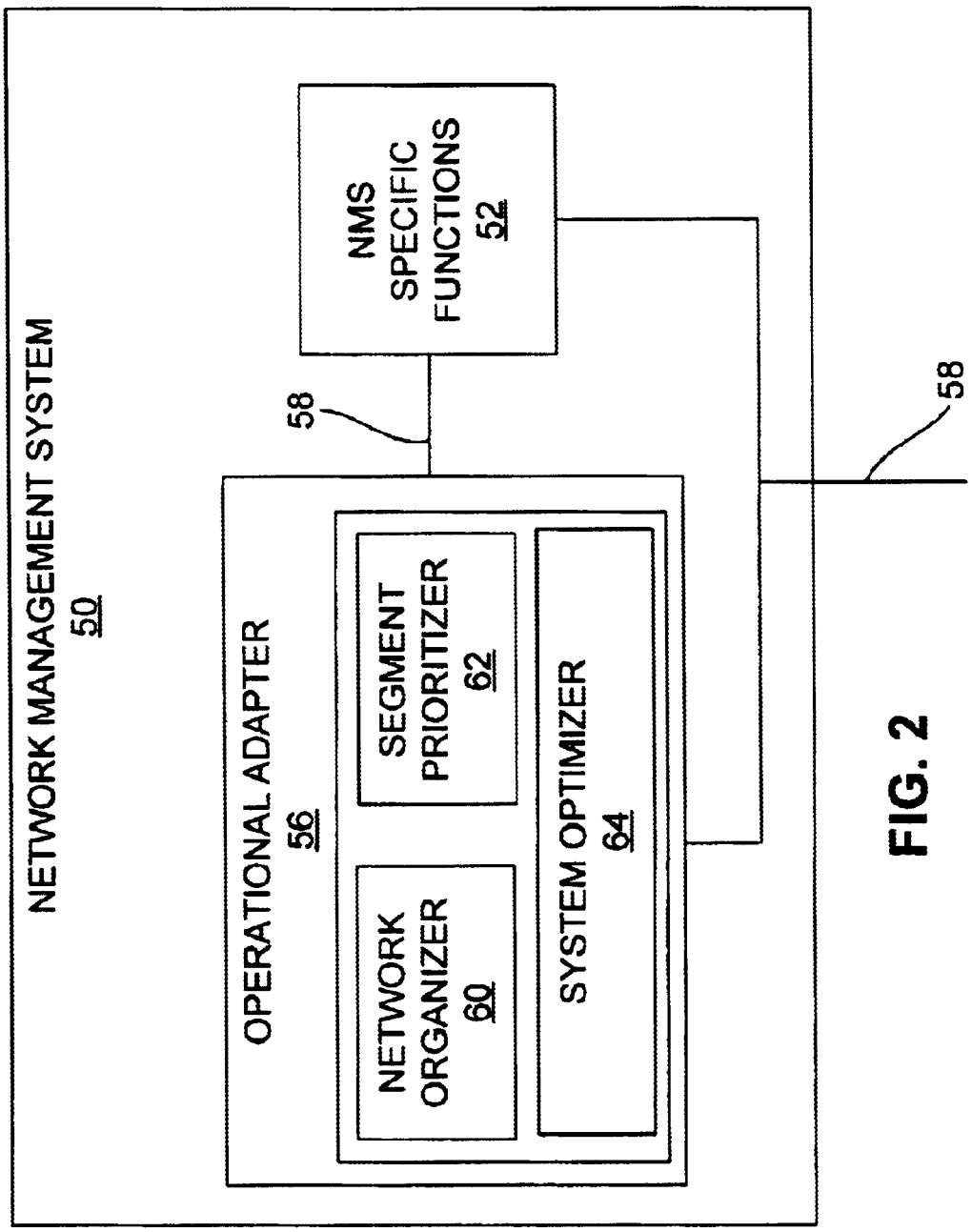
FIG. 2 illustrates a block diagram of the functional system components of a preferred embodiment of the present invention.

FIG. 2 illustrates a general block diagram outlining the functional elements of the inventive system as used with host computer 12 of FIG. 1. The skilled artisan will appreciate that other host computers 14–22 may be used to operate the inventive system, and therefore the following example is not so limited.

Network traffic analysis system ("NTAS") 50 is operable on host computer 12 (see FIG. 1) to perform particular network management operations with a network of computing and communication devices. Network communication devices could be selected from the group including network and personal computers, workstations, modems, printers, copiers, faxes, servers, repeaters, hubs, bridges, routers, probes, and switches.

NMS specific functions 52 perform the desired management operations on behalf of an NTAS administrator (not shown) via data bus 54 coupled to the devices of the network. For example, some NMS management operations could include defining the network node topology and transferring collected and stored traffic information to another software application for the NTAS administrator to review.

NTAS operational adapter 56 communicates with NMS specific functions 52 via well-known path 58 to control operation thereof With knowledge of the operational capabilities or saturation point of the host system on which the application 50 is operating, NTAS operation adapter 56 gates operation of NMS specific functions 52 to prevent the over-subscription of host system resources required for the NTAS application 50. In effect, operational adapter 56 acts as a governor to prevent the NTAS specific functions 52 from overwhelming the resources of the host computer on which it is operating.

In a preferred embodiment, operational adapter 56 includes three major functional modules: network organizer 60, segment prioritizer 62, and system optimizer 64. More specifically, network organizer 60 interacts with NMS specific functions 52 to retrieve network topology information for each segment and attached node. Next, the information is processed to organize lists of segments according to a specific aspect of the information. In a preferred embodiment, the organization or categorization would be subject to the data acquisition method used by the attached nodes. However, the initial categorization of the network segments could be subject to any network topology characteristic selected from the group including location, data acquisition method(s), network communication technology (s), number of nodes in each segment, and node device type(s).

Once the lists of segments are organized according to a data acquisition method, network organizer 60 utilizes the node information to predict a maximum protocol data unit ("PDU") credit value needed to request and receive ("exchange") traffic information from each segment in a segment list. This retrieval process is repeated for each list of segments. In turn, the number of times or frequency with which traffic information must be retrieved from each node, segment and/or list during a retrieval period will be determined such that all retrieval periods will not exceed an analysis period. As will be described in more detail below, the PDU credit value quantifies how much time and system resources will be necessary to obtain traffic information from a node. Consequently, network organizer 60 will acquire a PDU credit limit and an analysis period from the NTAS administrator to utilize the PDU credit values when managing the network. The PDU credit limit and analysis period will be discussed in detail below.

Segment prioritizer 62 ranks the organized lists of segments relative to the network topology characteristic used to distinguish each list. For example, in a preferred embodiment, segment prioritizer 62 first ranks the organized lists of segments according to their data acquisition method, and then further ranks all segments of each list by either the number of nodes, network communication technology or device type. Although there are various data acquisition methods available today, the fundamental methods on which they are all built are generalized below:

Tallying simple numeric counters: Almost every network infrastructure device and end node keeps a plethora of simple numeric counters whose meanings are dictated by industry-standard MIBs. The retrieval of such counters from a node is a relatively easy task for an application. To obtain a snapshot of such counters from a node an application must send a directed request PDU to the node; the node should send a corresponding directed response PDU to the application in response;

Collection and local analysis of detailed traffic information, either promiscuously (so that all traffic seen is analyzed) or using filters (so that only traffic with certain characteristics is analyzed): This type of traffic data collection requires a node to have a great deal more computing power and memory than are needed to tally the simple numeric counters described above. For this reason nodes that implement such detailed data collection and analysis are usually dedicated probe devices. The most widespread implementations of such detailed traffic monitoring are based on the RMON and RMON-II MIBs. In such a model data is not only obtained from the network, but also analyzed and reduced into lists and tables that are stored by the node. To retrieve such detailed data from a node an application must usually exchange a series of directed PDUs with the node; for each directed request PDU sent from the application, the node returns a corresponding directed response PDU. The volume of information retrieved can be somewhat large due to its level of detail, so a sequence of PDU exchanges is typically required for an application to complete a single retrieval of data; and Sampling PDUs from the network: This requires the node to promiscuously monitor all traffic on the segment attached to the node. Samples may be extracted from the observed traffic at regular or random time intervals, or separated by regular or random PDU counts. Each sample may then be sent to the application in an asynchronous fashion, to reduce the network overhead that would be involved if the application were required to poll for samples. Each sampled PDU is typically truncated to a maximum length and then packaged with a snapshot of key numeric counters, and all of this information is packaged into a single PDU that is transmitted asynchronously from the node to the application. This type of traffic data collection requires more computing power and memory than needed to tally simple numeric counters, but far less than needed to implement the detailed traffic data collection and analysis scheme described above. Though dedicated probes are available to perform this function, this scheme may also be implemented quite readily in network infrastructure devices because of its relatively small resource requirements. The most common implementations of such a sampling method are based on HP Extended RMON technology. After an initial configuration of each node that will supply data to it, an application incurs little or no overhead to retrieve data from a node; each node asynchronously sends every sampled PDU with no intervention required.

In accordance with a preferred embodiment, the last component of the inventive operational adapter 56 is the system optimizer 64. System optimizer 64 determines what prioritized segments or lists of segments should exchange traffic information with the NTAS so that an effective analysis can be obtained while preventing the NTAS application from reaching a saturation point during operation. More specifically, system optimizer 64 decides or allows the user to dictate:

which segments should provide network traffic information;

how many times, or the frequency with which, a single segment or node should provide traffic information during a retrieval period; and how much time should be allotted for an analysis period so that the network can respond to a request for network traffic information from the NTAS.

It should be noted that when the segment lists are created to reflect a different data acquisition method understood by the NTAS application, the application will be able to efficiently retrieve data from each node in a given segment list using a common method. In fact, with a few exceptions, the application should be able to issue the same sequence of directed request PDUs to any node in a segment list and receive the same number of directed response PDUs. An exception could include nodes that implement local collection and analysis techniques like RMON and RMON-II. With these techniques, the number of request and response PDUs, or exchange PDUs, needed to retrieve a particular type of data may vary depending on the volume and type of traffic information observed on a segment.

In most cases, an NTAS application can predict the exact number of PDUs it must send and receive each time it retrieves data from any node in a given segment list based on the data acquisition method employed by the nodes in that list. However, for cases where this number is not deterministic the NTAS application should assume a worst-case, or largest possible, value for the number of PDUs exchanged to retrieve the desired data. Request and response PDUs should be considered equivalent in this analysis and differences in the expected length of each PDU should be ignored. These factors typically have little effect on the time required for an application to interact with the host platform's input/output subsystem.

The data resulting from each data acquisition method supported by the NTAS application will likely be different and will therefore require a unique approach to analysis. An NTAS application should use the various data acquisition methods it supports to obtain complementary information about the network traffic. For the NTAS application to effectively monitor the network, the NTAS application should strive to gather data from all segments in the network using a common data acquisition method.

The retrieval of counter tallies will fulfill this objective in virtually all cases because it is widely supported and will convey enough information to detect common anomalous conditions. In fact, through various means, an NTAS application that collects traffic information from counter tallies should be able to detect, through analysis, what network segments are most susceptible to problems. Consequently, the NTAS application will be able to initiate data collection with a more detailed data acquisition method on such segments.

To enable the comparison of collected traffic information from segments using various data acquisition methods, the NTAS application should ensure that some level of commonality exists in the retrieved data, no matter which data acquisition method is employed. It is strongly suggested that the application structure the detailed data that it acquires via more sophisticated acquisition technologies (such as RMON or HP Extended RMON) so that it is a superset of the data acquired with the simplest technique supported (the retrieval of counter tallies).

A number of measurements may be tracked among all data acquisition methods, and each measurement provides a meaningful type of network media. In turn, each measurement can be tracked using any media speed. These measurements are enumerated below, and are usually measured by a node from the time that it boots and begins listening to traffic on the attached network.

The number of frames observed.

The number of octets observed.

The number of broadcast packets observed.

The number of multicast packets observed.

The number of errors observed.

To place such collected data into a meaningful context an NTAS application must associate the data with bounded time intervals. The duration chosen for the intervals, and quite possibly the type of analysis and reduction performed on the collected data before it is stored, will depend on the purpose of any consumer applications that may utilize the collected data. Some applications might analyze the collected traffic data for conditions that indicate current or pending problems; because such occurrences are of an urgent nature this type of consumer would require that traffic data be supplied on a frequent basis, perhaps once per minute. Other applications could analyze collected traffic data for trends that happen over weeks or months, then predict the occurrence of problems before they actually happen. For example, a segment's capacity could be outstripped by the bandwidth requirements of its attached nodes over time.

Such evolutionary problems tend to appear as a network grows in size and therefore happen over relatively long time frames. Consumer applications that focus on this type of trend analysis and prediction would require that traffic data be supplied on a relatively infrequent basis, perhaps once per hour or once per day. In any case, the designers of an NTAS application must decide how frequently they wish to partition the data collected by their application into an analysis period.

Several measures that could be extracted from a segment using different data acquisition methods were suggested earlier, but perhaps the most useful to a network monitoring application is the count of octets that are seen on a segment. Any of the suggested values can be measured over an interval by subtracting the counter tally at the beginning of the period from the counter tally at the end of the period, as long as counter rollover is considered when taking the difference. By computing the number of octets observed during the application's analysis period and dividing by the number of seconds in the period, the number of octets observed can be expressed as an average per unit of time over the analysis period. Such rates are most commonly expressed in units of octets/second or bytes/second.

With the numerous network communication technologies available today it is unusual to find networks that are homogeneous in the type of technology used to implement them. Most networks consist of a mixture of Ethernet, Fast Ethernet, and Gigabit Ethernet technologies. When a single network monitoring application attempts to compare octets/second or any other data rate measured on media of different characteristics and speeds it quickly becomes apparent that such comparisons are meaningless due to the varying capabilities of the different network communication technologies. However, if the value that was measured for octets/second on a segment is divided by the maximum number of octets/seconds that could be transmitted on the segment based on its media type and speed, the result is a normalized value called the network utilization. The network utilization can be used to compare the performance of segments that are monitored by an application no matter what type of technology was used to implement the segment. To illustrate, consider the following table of hypothetical octet measurements from two monitored segments in a network.

| Segment Type | Capacity (bytes/second) | Hypothetical Measure (bytes/second) | Utilization (%) |
| --- | --- | --- | --- |
| Ethernet | 1250000 | 625000 | 50 |
| Fast Ethernet | 12500000 | 3125000 | 25 |

Although the number of bytes counted on the Fast Ethernet segment is five times greater than the number of bytes observed on the Ethernet segment, the utilization of the Ethernet segment is twice as high as the utilization of the Fast Ethernet segment. Though this is a simplified example, it illustrates that until the octet rate is placed into context using the characteristics of the segment from which it was acquired, namely the segment's capacity, it cannot be meaningfully compared to dissimilar segments in the monitored network. As will be discussed later, tracking the utilization of monitored segments between analysis periods will permit a network monitoring application to optimize the information it gathers while limiting its operation with a PDU credit limit.

The PDU credit limit addresses the fact that the consumption of host system resources by an NTAS that continuously collects traffic information from a network is usually proportional to the rate at which the NTAS exchanges traffic information with nodes on the network. This is true because many of the actions taken by an NTAS either generate outbound traffic or are initiated by inbound traffic. Therefore, most of the system resources consumed are directly related to the NTAS application's exchange of traffic information with other nodes. Consequently, bounding the amount of traffic information the NTAS may exchange with other nodes during a unit of time will effectively limit the system resources that the application may consume.

The amount of traffic exchanged between an NTAS application and the nodes that provide data to the application is typically determined by two factors: the size of the network that is to be managed and the type of data to be retrieved. This invention injects a third parameter into the mix, the PDU credit limit assigned to the network management application. The PDU credit limit may be defined as the maximum number of PDUs ("protocol data units") that can be exchanged between an NTAS application and other nodes in the network during a unit of time. This limit must be self-enforced by the application. When a software application, e.g. NTAS, adheres to its specified PDU credit limit, then the host system resources consumed by the application may be adjusted by varying the PDU credit limit. The unit of time applied to an application's PDU credit limit may be of any period desired but in most cases (and in the illustrative examples of this document) a period of one second will suffice. This in turn will dictate that the PDU credit limit is expressed in units of PDUs/second.

The following list generalizes the options that are available:

The designers of an NTAS application may arbitrarily assign a limit that allows the application to function ably in the majority of expected customer environments. This is the simplest method of establishing a PDU credit limit, as the limit can be assigned to an NTAS application via a hard-coded bound. Such an arbitrary limit could also be assigned temporarily until another mechanism was applied that would attempt to adjust the PDU credit limit to the application's environment.

A PDU credit limit could be assigned upon installation of the NTAS application based on an inspection of the host system's hardware and software configurations. A separate process, or perhaps even the application itself, could evaluate the system's capabilities to establish an appropriate limit. The processor type and speed, amount of physical memory, and the number and media speed of LAN cards are the sort of hardware items that could be considered in such an approach. The operating system, amount of virtual memory, and the number and type of protocol stacks indicate the type of software features that should probably be inspected. Such inspection-based assignment of the PDU credit limit would provide more flexibility than the arbitrary assignment method discussed above, allowing the application to use system resources more effectively on hosts of varying capabilities. Depending upon how the inspection was implemented a user interface could even be provided that would allow the user to initiate a new inspection of the host system on demand, so that the PDU credit limit could be adjusted to accommodate changes to the network system configuration.

A PDU credit limit could be established by experimentation once the application is installed on a particular host system. A mechanism for deriving a PDU saturation point is described in U.S. patent application Ser. No. 09/273,412 entitled *Methods and Systems for Dynamic Measurement of a System's Ability to Support Data Collection by Network Management System Applications*, by Steve Britt and Linda Klinger having the same assignee and is incorporated herein by reference, now U.S. Pat. No. 6,430,617. In particular, an application could equate its PDU credit limit to its PDU saturation point, or could compute the limit as a percentage of the saturation point. Such empirical measures require an NTAS application to implement a special calibration mode, but can result in very precise PDU credit limits that reflect the application's ability to run on specific host systems. These empirical methods can establish PDU credit limits that account not only for the hardware and software configuration of a host system, but also take into account the resource demands of other applications that are executing on a host. This is the most flexible method of establishing a limit because it incorporates the peculiarities of each host system and the other programs being executed into its assessment of the available system resources. As with the inspection-based method discussed above, a user interface could be provided that allows the user to recalibrate the PDU credit limit if some aspect of the host system configuration was changed.

Process of Invention

Having described the system for operating the present invention, a description of the process will now follow with the help of two flow charts and a hypothetical example.

Figure 3:
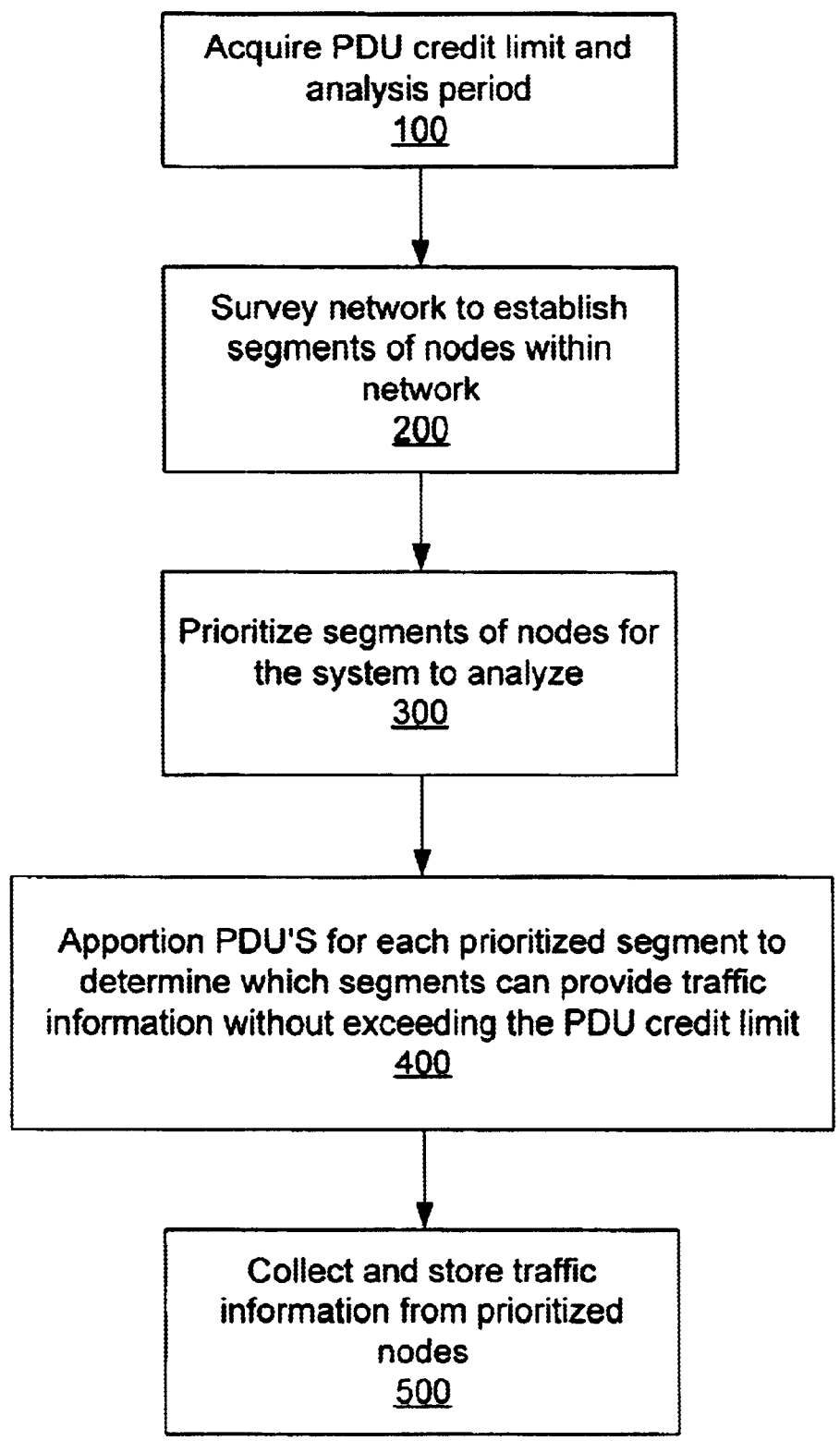
FIG. 3 illustrates a general flow chart that recited the operation process of the present invention.
Figure 4A:
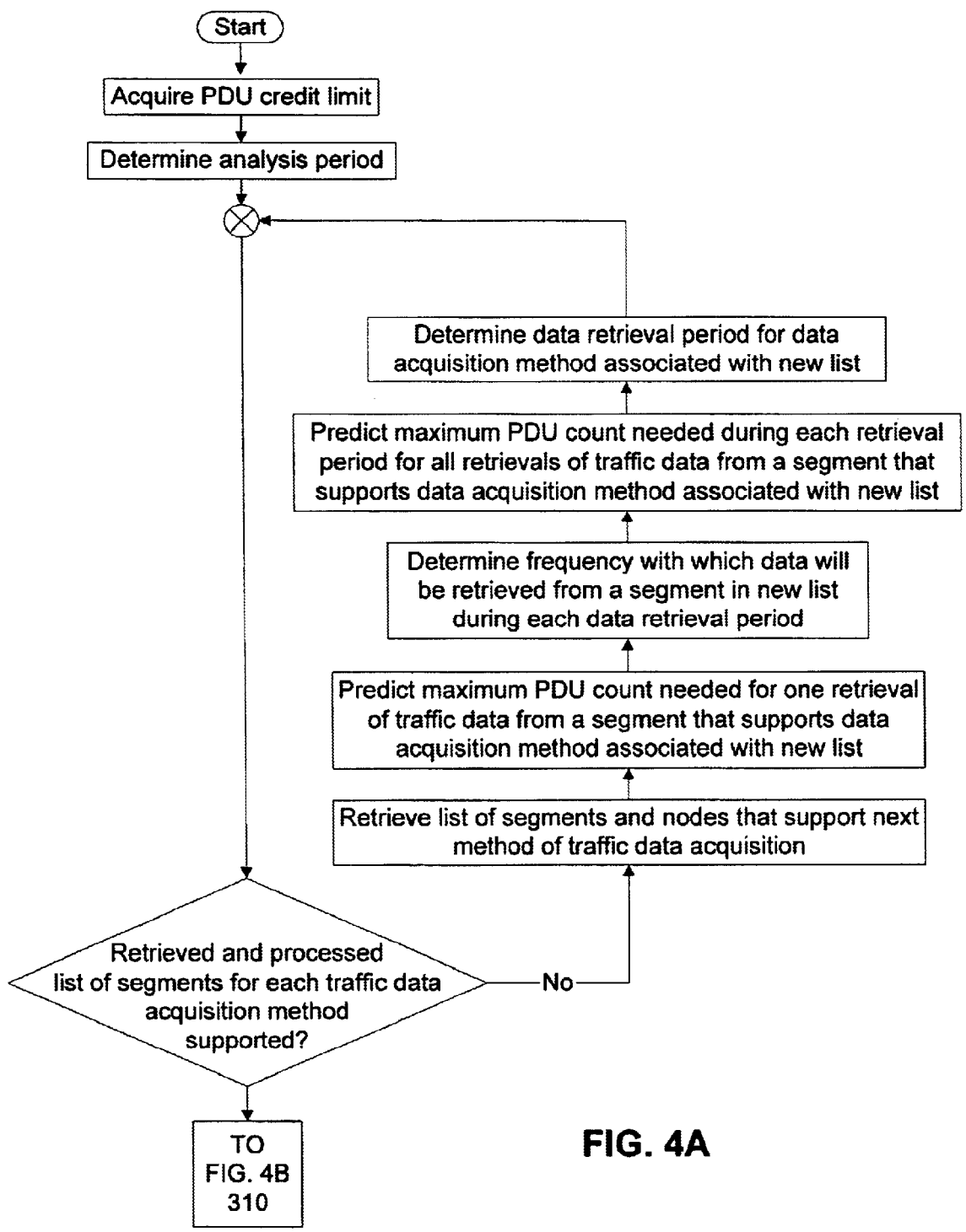
Figure 4B:
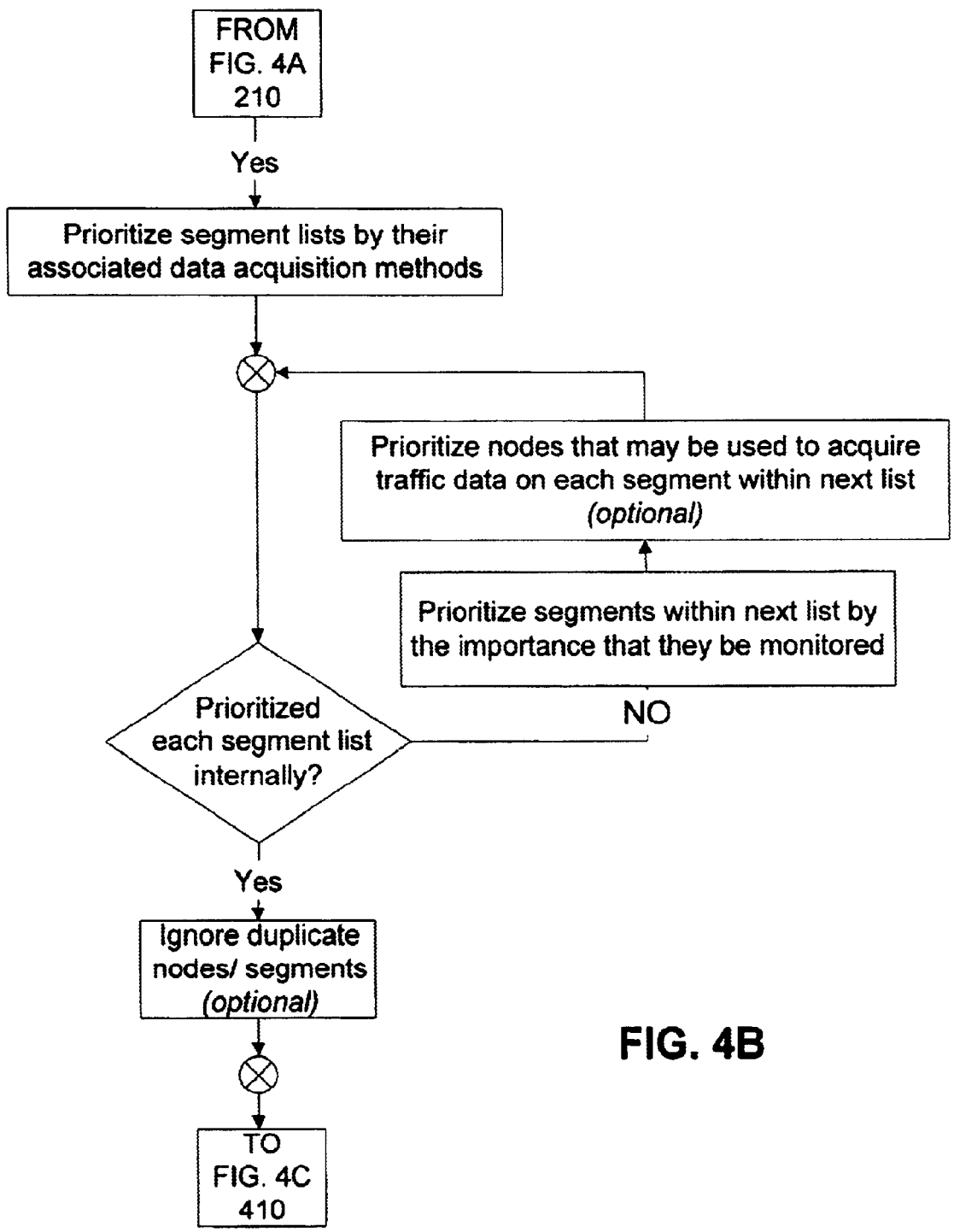
Figure 4D:
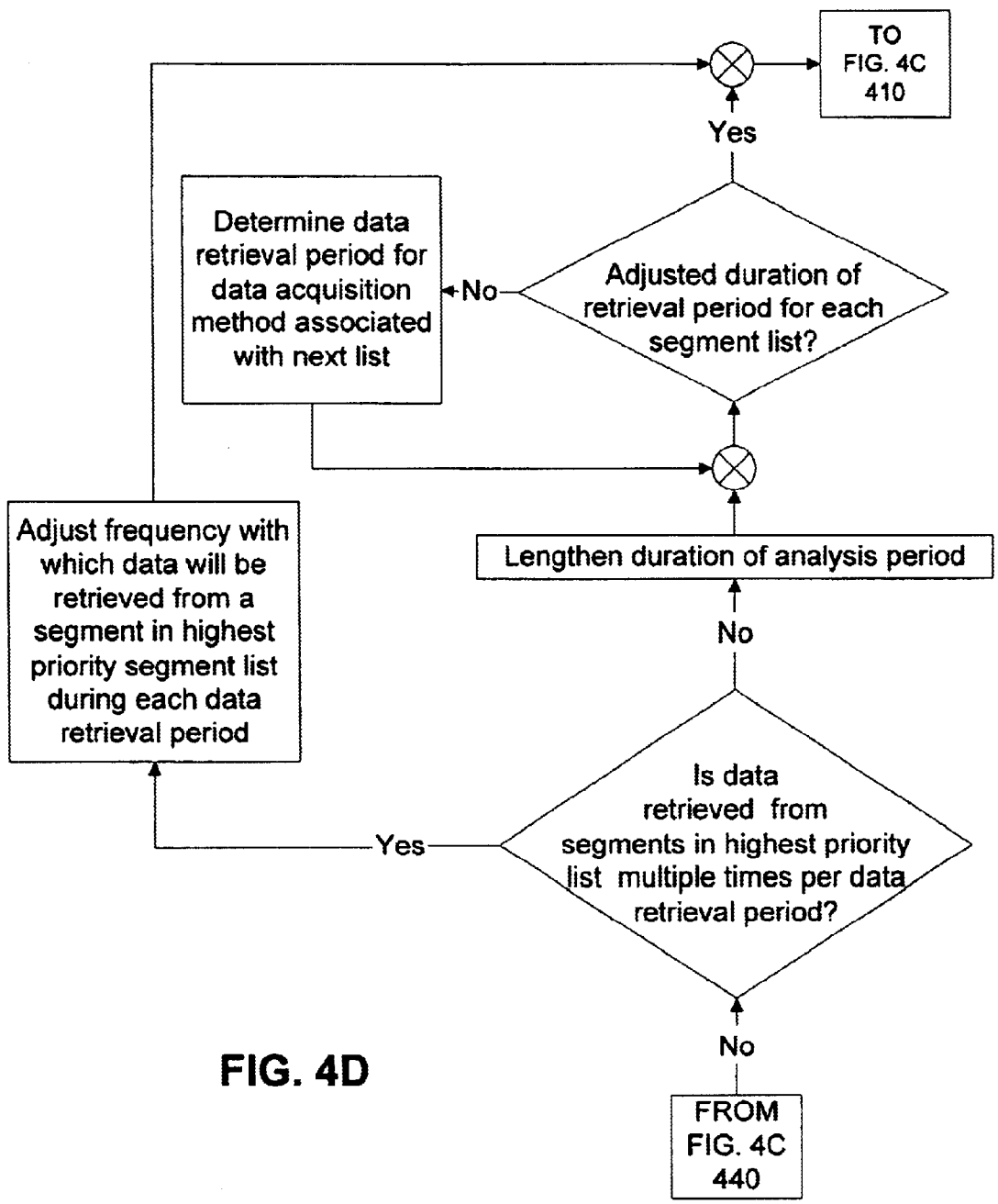
Figure 4E:
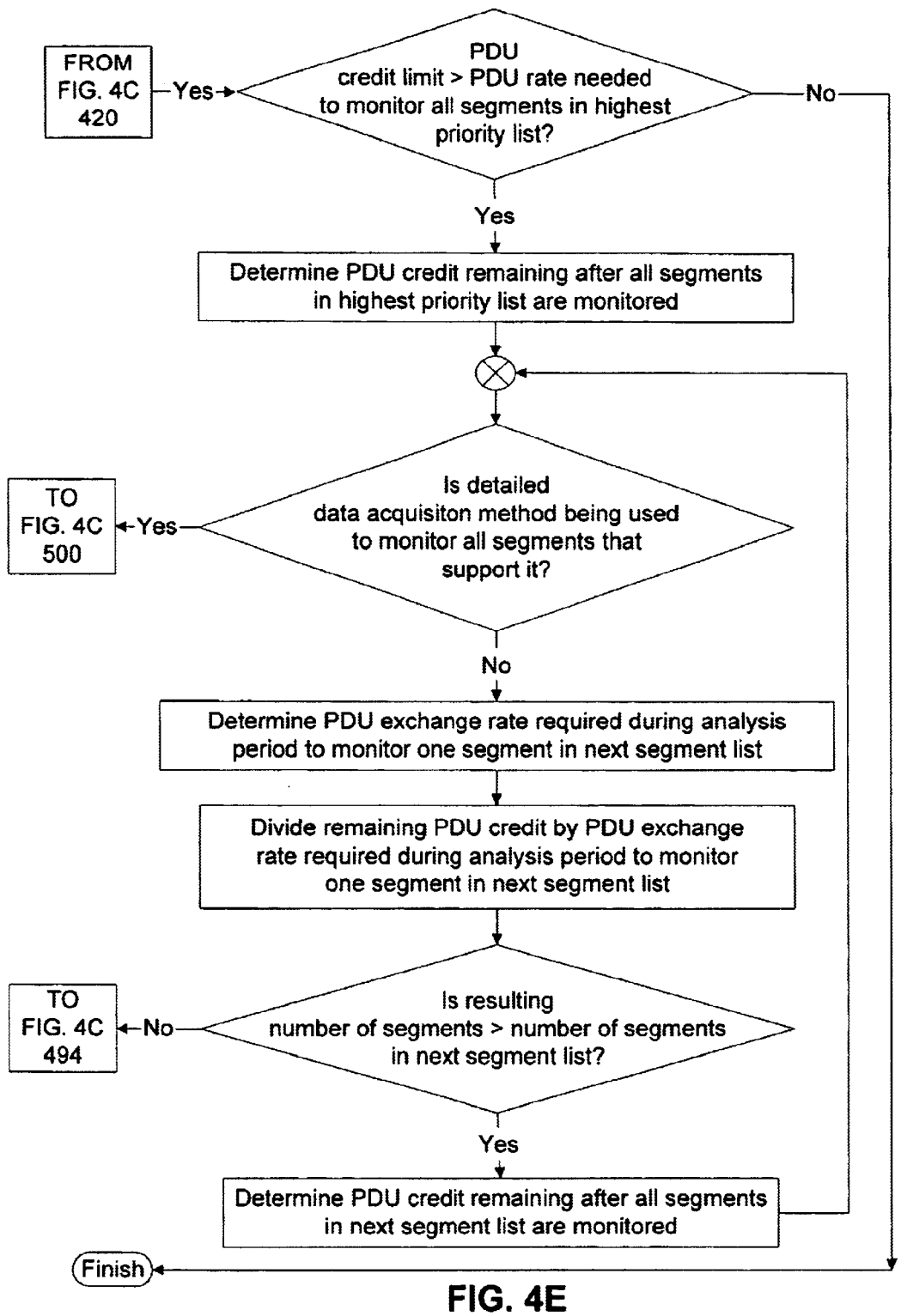

Turning now to the first flow chart, FIG. 3 illustrates the basic conceptual process steps involved with a preferred embodiment of the present invention. In particular, operational adapter 56 (see FIG. 2) interacts with a desired network management system ("NMS") application to obtain a protocol data unit ("PDU") credit limit and an analysis period 100 from the NMS administrator. Next, the operational adapter instructs the NMS application to survey the network to establish network topology information about all segments within the network 200. Example NMS application packages that may be used for the above steps could be selected from the group including HP TopTools® and the HP OpenView® Network Node Manager. However, a skilled artisan will appreciate that the invention is not so limited, and consequently, other NMS application packages could be used.

With the PDU credit limit, analysis period, and network survey established, the inventive operational adapter 56 will prioritize the network segments 300. The process for prioritizing the segments can be very complex and may be subject to various factors selected from the group including data acquisition method used by a node and/or segment, network communication technology, network node devices, number of nodes in segment, and recognized problem areas of network nodes and/or segments. Each of these factors will help to define the most functional prioritization strategy for managing the network.

The final step of the inventive process involves the NTAS application apportioning the PDU credit limit among the highest priority segments 400. This process may be as simple as subtracting the total number of PDUs necessary to request and receive traffic information from all segments and data acquisition methods on the network according to their prioritization. However, the process could also be much more complicated. For example, given the size of networks today, the process could involve: first, determining that the total number of PDUs for the highest priority list does not exceed the PDU credit limit; second, determining how much of the PDU credit limit is remaining; and third, determining how many segments that may actually provide detailed traffic information for problem areas can provide the information to the NTAS before its PDU credit limit is expended.

Once the optimal process for obtaining traffic information from a list of prioritized segments of a network has been determined, the NTAS will initiate the collection and storage of the desired traffic information 500 to be analyzed.

Turning now to the second flow chart, the general process steps in FIG. 3 will now be expanded with reference to FIGS. 4A–4E. As suggested by FIG. 3, the first step of the inventive process involves acquiring a PDU credit limit 110. A PDU credit limit can be established in a variety of ways as described above.

After a PDU credit limit has been established, the next step is to determine an analysis period 120. The analysis period can be defaulted to a fixed value or configured by the NTAS application administrator.

Next, the NTAS application will retrieve and process all network traffic information from each node of the network and organize the nodes into list of segments for each data acquisition method supported by the application 210. As mentioned earlier, the creation of the lists of segment involves the following steps:

Retrieve list of segments and nodes that support next method of traffic data acquisition 212;

Predict maximum PDU count needed for one retrieval of traffic data from a segment that supports data acquisition methods associated with new list 214;

Determine frequency with which data will be retrieved from a segment in new list during each data retrieval period 216;

Predict maximum PDU count needed during each retrieval period for all retrievals of traffic data from a segment that supports data acquisition method associated with new list 218; and Determine data retrieval period for data acquisition method associated with new list 220.

The skilled artisan should appreciate that any type of network information provided by the segments or nodes can be used to organize the segment lists. For example, each list of segments could be defined by the number of nodes that each segment contains, the type of device associated with a node, the network communication technique used by a node, traffic data acquisition method(s) used by a node, or any combination thereof.

Information about a network segment may appear in more than one segment list if the nodes attached to it support a variety of data acquisition methods, which is often the case. In fact, the same node may appear associated with the same segment in more than one list if the node itself supports multiple data acquisition methods. Of course, each node identified should be capable of responding to directed PDU requests from the NTAS application, either with a corresponding directed response or a stream of directed traffic information as appropriate. This will allow the system administrator to stipulate that the NTAS application should ignore duplicate nodes or segments by marking or removing them from its lists as appropriate.

As mentioned earlier, because the traffic data resulting from each data acquisition method is different and must be analyzed in a unique manner, an NTAS application will be able to support only a limited number of data acquisition methods. For example, data retrieved from nodes that implement MIB counters, RMON data collection, and HP Extended RMON sampling varies a great deal in format and requires quite distinct processing. So, given the types of traffic data that it is capable of analyzing, an NTAS application must prioritize the use of these data acquisition methods from the most to the least important 310 (see FIG. 4B). The process of prioritizing the data acquisition methods associated with each segment list should be repeated with the remaining lists until each list has been ordered with respect to the others 312.

The data acquisition method that is most prevalent among the network's nodes should be given the highest priority, as its prevalence will permit the application to report consistent data for the greatest number segments. Almost without exception the data acquisition method labeled as highest priority will be the retrieval of counter tallies. Counter tallies can be supplied cheaply and efficiently by a variety of nodes; in a typical managed network this results in a very high percentage of nodes that are capable of supplying such data.

Next, the segments within each list must be prioritized such that a finished list has the most important segment to monitor at its start and the least important segment to monitor at its end 314. Any criteria may be used to order the segments, and the criteria selected will vary with the overall purpose of the NTAS application. For example, an application that monitors the network for outages, errors, or performance problems might prioritize segments by the number of end nodes attached to them since a larger number of nodes will increase the opportunity for such occurrences.

After the segments within each list have been ordered yet another ordering may be performed, though it is not absolutely necessary 316. By its nature, communication via a network requires that a node examine all of the traffic information received to determine whether the traffic is meant for it. All of a segment's nodes can access the traffic even if they choose to filter extraneous PDUs that are not destined specifically for them. Since all nodes on a segment are exposed to the same traffic, if traffic data is obtained from one node on a segment there is no reason to obtain the data from another node as well because the data should be identical.

In the preferred embodiment, each list of segments contains nodes that all implement the same technique for traffic data acquisition. Therefore, within each list only a single node on each segment should be used at any time by an NTAS application to obtain the type of traffic information associated with the list. The fact that all nodes in a segment list implement the same type of traffic data acquisition method does not, however, imply that each node is equally adept at this role, particularly when detailed traffic information is to be gathered. For this reason, an application may choose to iterate through the segment list more than once.

For each segment in a list, the nodes listed as potential data sources may be ordered to reflect a preference for the source of the particular type of monitoring data associated with the segment list. Any criteria may be used to order the nodes, though it is recommended that the ability of each node to supply complete and accurate traffic data be used for this task. In turn, if stipulated by the NTAS application administrator, the criteria for ordering the nodes may also reflect the NTAS application's removal of duplicate nodes and/or segments between lists during the traffic information prioritization process or marking the same so as to be ignored during the PDU apportion process 318.

Given an analysis period, PDU credit limit, and at least one prioritized list of segments having a common data acquisition method supported by the NTAS application, the system administrator must select a data retrieval period for each data acquisition method and the frequency at which traffic information is collected and stored 410 (see FIG. 4C). The retrieval period associated with a data acquisition method will be applied to every segment in the segment list corresponding to that method. Each retrieval period is derived from the analysis period, and should always be less than or equal to the analysis period, because a retrieval period represents the amount of time allotted to the retrieval of a certain type of traffic data during an analysis period.

To illustrate, consider a case in which simple numeric counter tallies will be retrieved from each segment in a list using an octet measurement as described earlier. Assume further that the data obtained from each segment will be requested using one PDU and returned via a single corresponding PDU. Suppose too that the NTAS application distributes the retrieval of such data from segments as evenly as possible throughout the retrieval period to avoid oversubscribing the network subsystem of the host platform with a large number of simultaneous requests. If the start of a data retrieval period is synchronized with each new analysis period, it would be prudent to stop sending data requests for some interval before the analysis period ends. This step will allow sufficient time for the nodes contacted last to formulate and send their responses. If the analysis period were one minute and five seconds were allowed for the collection of outstanding tally counter responses, then the data retrieval period allotted for segments on which simple numeric counter tallies are monitored would be 55 seconds.

After a data retrieval period has been selected for a particular data acquisition method, the designers of the NTAS application must determine how many times or how frequently traffic information should actually be obtained from each segment that uses the data acquisition method during each retrieval period. In most cases a single retrieval of data from each segment will be sufficient during each retrieval period. However, there may be unusual considerations that require data retrieval to happen more frequently from segments that implement a certain data acquisition method.

When the number of data retrievals needed during a single retrieval period has been determined for one of the data acquisition methods supported by the NTAS application, this number may be multiplied by the maximum number of PDUs needed for each data retrieval. The result will be the maximum number of PDUs that will be exchanged during each retrieval period from the PDU credit limit during each analysis period, between the application and one segment that employs the data acquisition method. This multiplication should be performed for every data acquisition method supported by the NTAS application.

At this point the network monitoring application has established all of the information needed to apply a PDU credit limit to optimize its behavior for the host system on which it is executing. Recall that the PDU credit limit is expressed as a rate, usually in PDUs/second, and represents the maximum number of PDUs averaged per time unit that the application may exchange with other nodes in the network to be monitored.

Now, for each data acquisition method it supports, the application must determine the number of segments that can be monitored while averaging fewer PDUs per unit of time than the PDU credit limit 420A. Because the number of PDUs required to monitor each segment is averaged over time, the application must distribute its collection of data from segments in each of its segment lists as evenly throughout the appropriate data retrieval periods as possible. This distribution or apportionment step of the PDU credit limit among the prioritized network segments can be performed by any conventional method. However, the method should allow the flow of PDUs between the NTAS application and nodes from which it acquires data to be as steady as possible throughout the applicable data retrieval period, and therefore throughout each analysis period.

The adaptive NTAS application should begin its computations with the segment list that was assigned the highest priority for monitoring based on the type of data acquisition method associated with it. The application shall attempt to collect data from a node on every segment in this list, and must determine whether it was allocated enough PDU credit to do so. The maximum number of PDUs needed to obtain data from one segment in the list during each retrieval period can be multiplied by the number of segments in the list, yielding the maximum number of PDUs required to obtain data from every segment in the list during a retrieval period. The resulting number of PDUs may then be divided by the length of the retrieval period, yielding the maximum number of PDUs that must be exchanged per unit of time (the rate) to retrieve data from every segment in the list. This computation is described by the following equation:

$$\text{(max } PDUs \text{ necessary to retrieve data from list per unit time)} = \frac{\text{(max PDUs for one list segment)} * \text{(\# of list segments)}}{\text{(data retrieval period for segment list)}}$$

Next, the PDU credit limit must be compared with the PDU rate just computed. If the PDU credit limit assigned to the application is less than the maximum rate at which PDUs must be exchanged to retrieve data from each segment in the list 420B, the application must take one of three actions:

Terminate due to the insufficient PDU credit limit 430A and finish 500;

Continue 430B and 440A, even though the maximum number of PDUs required to retrieve data from each segment in the highest priority segment list per unit of time exceeds the specified PDU credit limit and finish 500;

Continue 430B and 440B, and adjust the number of times or frequency with which data is retrieved from each segment in the list during an analysis period 450, 452. If data is only being retrieved once per analysis period, an alternative might be to lengthen the analysis period so that fewer PDUs are needed per unit of time to retrieve data from each segment in the list 450, 454, 460, 462. The process of determining an appropriate number of retrievals per analysis period or an appropriately long analysis period may need to be iterative. After choosing a new value for either parameter, the same computation performed earlier for the maximum rate at which PDUs must be exchanged to retrieve data from segments in the highest priority list should be repeated, and the result should again be compared to the PDU credit limit 410.

If the NTAS application continues operation but adjusts neither the frequency of data retrieval from each segment during the analysis period (steps 450, 452) nor the duration of the analysis period itself (steps 450, 454, 460, 462), then it should not attempt to retrieve more detailed traffic information from the segments in any of its other segment lists and should instead finish 500. If the NTAS application does elect to apply adjustments it must be careful to ensure that the integrity and accuracy of the resulting traffic data is preserved despite the adjustments. In turn, the application will also consider how a lengthened analysis period will effect the consumer applications that analyze the resulting traffic data. Once the step of finish 500 is reached by the NTAS application, the application may initialize the collection and storage of the desired traffic information using conventional software applications for analyzing network traffic information. Example software application packages that may be used for the above steps of collection, storage and analysis could be selected from the group including HP TopTools® and HP OpenView®. However, a skilled artisan will appreciate that the invention is not so limited, and consequently, other application packages could be used.

If the PDU credit limit is exactly the maximum rate at which PDUs must be exchanged to retrieve data from all segments in the highest priority segment list 470A, the application must not attempt to retrieve more detailed traffic information from segments in any of its other segment lists. Once again, the NTAS application reaches finish step 500.

Suppose that the PDU credit limit exceeds the maximum rate at which PDUs must be exchanged to retrieve data from all segments in the highest priority segment list 470B, irrespective of whether the frequency of data retrieval from each segment during the analysis period (steps 450, 452) or the analysis period itself were adjusted (steps 450, 454, 460, 462). The difference between the two values represents the remaining PDU credit that may be dedicated to the retrieval of more detailed traffic information from the monitored network 472. This difference is expressed by the following equation:

$$\text{(PDUs available to obtain detailed data per unit of time)} = \text{(PDU credit limit)} - \text{(max PDUs to obtain from highest priority list per unit of time)}$$

The application may now iterate through its remaining segment lists, each associated with a different data acquisition method that supports the collection of more detailed traffic information, in order of their decreasing priorities for monitoring 480. The segments in each segment list should be considered separate and distinct from the segments in all other segment lists; this statement includes the highest priority list that was already processed. Though a segment may appear in more than one list, and in turn the same node may exist on the same segment in multiple lists, the types of traffic data acquired by the nodes of each list are distinct.

While processing the remaining lists, if the NTAS application encounters a segment from which traffic data is being gathered via another data acquisition method it may terminate collection of less detailed data from the duplicate segment, then reclaim the associated PDU credit and initiate the collection of more detailed information 480A. The application could alternatively ignore the fact that data is already being collected from the segment and initiate more detailed traffic data collection from the same segment using a different data acquisition method. The second method allows the application to provide less detailed traffic data rather than no traffic data in cases when attempts to collect detailed traffic information from a segment are unsuccessful.

While processing the segment lists that remain after the highest priority list, the NTAS application should apply the same mechanics used for the highest priority segment list with one notable exception; the application must not assume that all of the segments in its other lists will be monitored 482. In other words, the NTAS application must henceforth be capable of monitoring only the number of segments from a list that are permitted by the remaining PDU credit. The maximum number of PDUs needed per unit of time to monitor a single segment from the next list during the list's associated retrieval period should be divided into the PDU credit that remains after analyzing the previous segment list 484. The result will indicate the number of segments in the next list from which data can be retrieved during an analysis period 490. This calculation is illustrated by the following equations:

$$\text{(max PDUs needed to obtain segment data from next segment list per unit of time)} = \frac{\text{(max PDUs to retrieve segment data from next segment list)}}{\text{(data retrieval period associated with next segment list)}}$$

$$\text{(\# of segments that can be monitored with data acquisition technique of next list)} = \frac{\text{(PDUs available to retrieve detailed traffic data per unit of time)}}{\text{(max PDUs needed to obtain segment data from next segment list per unit of time)}}$$

The value resulting from this computation is unlikely to be a whole number, and any fractional remainder should be ignored. The quotient may be compared to the number of segments in the next segment list. If the quotient equals or exceeds the number of segments then the remaining PDU credit is sufficient to monitor all of the segments in the list 490. The maximum number of PDUs needed per unit of time to monitor a single segment from the next list during the list's associated retrieval period can be multiplied by the number of segments in the next list. The result will be the maximum rate at which PDUs must be exchanged to retrieve data from every segment in the next segment list. This computation is described by the following equation:

$$\text{(max PDUs to retrieve segment data from next segment list per unit of time)} = \frac{((\text{max PDUs to retrieve segment data from next segment list}) * (\text{\# of segments in next list}))}{(\text{data retrieval period associated with next segment list})}$$

This value may be subtracted from the PDU credit that remained after processing the previous segment list to yield the PDU credit that may be dedicated to the retrieval of detailed traffic information from the monitored network via different mechanisms that are considered lower in monitoring priority 492. This difference is expressed by the following equation:

$$\text{(PDUs available for retrieval detailed traffic data per unit of time)} = \text{(PDUs available for retrieval detailed traffic data per unit of time)} - \text{(max PDUs to retrieve segment data from next segment list per unit of time)}$$

The application may subsequently iterate through the remaining segment lists, processing each until no more segment lists exist or until an insufficient number of PDUs per unit of time are available to collect any more data from nodes in the network 480–492.

Recall that the number of segments in the next segment list from which data can be retrieved during an analysis period was calculated as a quotient above. During iteration through those segment lists that remain after the highest priority list it is possible, if not likely, that the number of segments in the next list from which data can be retrieved during an analysis period will be less than the number of segments in the list. This indicates that only a subset of the segments in the list may be monitored 494, and the ordering of the segments within the list will determine which are selected as the most important to monitor. The maximum number of segments that can be selected for monitoring from the list will be equal to the quotient. Consequently, the application should not attempt to retrieve detailed traffic information from segments in any of its remaining segment lists and finish 500.

Example of Invention

To illustrate an example of the present invention in light of the above flow charts of FIGS. 3 and 4A–4E, consider the following hypothetical parameters obtained either by design or measure as appropriate:

A PDU credit limit (110) of 50 PDUs/second.
An analysis period (120) of one minute in length.
A network to be monitored that consists of 800 total segments (200–220).
  All of the segments support traffic monitoring via retrieval of counter tallies.
  200 of the segments also support traffic monitoring via sampling of PDUs (using HP Extended RMON technology).
  100 of the segments support traffic monitoring via local collection and analysis of detailed traffic information (using RMON-II technology).
Two data acquisition methods are supported by the NTAS application:
  Retrieval of counter tallies.
    The data retrieval period for counter tallies is the first 57 seconds of the analysis period.
    Data is retrieved once from each segment during the retrieval period.
    Obtaining data from one segment requires that one request PDU be sent. The expected response also consists of a single PDU.
  Sampling of PDUs from the network.
    Samples are sent autonomously from each segment, so the data retrieval period for the samples is the entire 60 seconds of the analysis period.
    An average of one PDU per second arrives from each segment. The number of PDUs sent to the sampling nodes by the application is so small that it may be ignored.
The retrieval of counter tally data is considered to be of higher priority than the retrieval of sampled PDU data (310).

Since the NTAS application does not support a data acquisition method based on RMON-II it will ignore the fact that this type of monitoring is available on some of the segments in the network. The retrieval of counter tally data is of greater importance to the application than the collection of sampled PDU data, so the PDU credit limit should be applied to the two data acquisition methods in that order of priority (312–316).

Two PDUs are needed to retrieve counter tally data from each of the network's 800 segments during each analysis period, and the retrieval period for segments that support counter tally data is 57 seconds. Therefore, the average number of PDUs/second generated by the retrieval of counter tallies throughout the network may therefore be computed as follow (410).

(800 segments)*(2 PDUs/segment)/(57 seconds)=28.07 PDUs/second

This average number of PDUs/second is considerably lower than the initial PDU credit limit (420A, 470B). The difference between the two may be computed as follows.

(50 PDUs/second)−(28.07 PDUs/second)=21.93 PDUs/second

An average of one PDU per second will be received by the application from each segment on which it initiates sampled PDU data acquisition. Given a remaining PDU credit value of 21.93 PDUs/second, only 21 of the 200 segments that support traffic data acquisition based on HP Extended RMON may be monitored (472), as evidenced by the following calculation.

(21.93 PDUs/second)−(21 PDUs/second)=0.93 PDUs/second

Ordering within the list of segments that support HP Extended RMON data acquisition now becomes a critical issue (480), as only the 21 segments considered most important will be selected for monitoring. The remaining fraction of a PDU/second will remain unused since it is too small for the NTAS application to gather detailed traffic information from another segment that supports HP Extended RMON data acquisition.

After the application has determined the number of segments that can be monitored in the network via the different data acquisition method that it supports, it should finish and initiate data collection on the appropriate segments (500). Mechanisms for initiating data collection, processing the data, and analyzing it are not specified by this invention.

As discussed earlier with regards to network utilization, an NTAS application should strive to collect a common set of statistics for the segments that it is monitoring. Under certain conditions such an application could analyze these common statistics to augment the prioritization of segments for detailed monitoring that was earlier established using static information about the segments, then adjust the group of segments from which it is collecting detailed traffic data. Such a system would prove useful if the application has PDU credit remaining for some form of detailed traffic data collection, but not enough remaining PDU credit to collect the detailed information simultaneously from all of the segments in the associated segment list.

Since common statistics would be gathered from every segment capable of supplying that particular type of detailed traffic data, irrespective of whether that data acquisition method or another was actually used to collect the statistics, all of the segments that support the data acquisition method could be prioritized against one another. Segment utilization is an especially useful statistic for this purpose since, as mentioned earlier, it provides a normalized measure of the activity on each segment irrespective of the segment's media type or speed.

If an application is interested in gathering detailed traffic data from the busiest segments that support the data acquisition method, it can track the utilization of each segment throughout regular periods of time. The period chosen should be a multiple of the application's analysis period, and at its shortest should be equal to the analysis period. Any common statistical measure deemed useful could be analyzed in place of the segment utilization, and such statistical measures could also be combined with other factors (such as the number of nodes attached to each segment) when reassessing the set of monitored segments at the end of a period. Note that in such a system, the amount of PDU credit devoted to the collection of detailed traffic information would be fixed, and that only the set of segments that are monitored using the remaining PDU credit would vary between periods.

Summary

Most continuous network management system ("NMS") applications available today employ dedicated probe devices that collect detailed information from the single segment to which they are attached. The cost and complexity of these solutions usually prevent administrators from deploying such technology on every segment of their network, restricting the segments that they can monitor to those deemed business-critical. Other network monitoring systems provide retrieval of simple numeric counters that are available in almost all network infrastructure devices. Though inexpensive to deploy, such systems typically require considerable user interaction and do not gather traffic information continually; therefore they do not provide a satisfactory monitoring solution in large networks.

Few of the NMS applications associated with any monitoring system are cognizant of whether they are installed on a dedicated host computer. Consequently, they execute their algorithms without regard to the capabilities of the host systems or the impact that their actions may have on other software applications that share the host computer resources. The NMS applications that do inspect certain statically configured aspects of their host system and adjust behavior accordingly, all have the same shortcoming: it is impractical and imprecise to inspect all of the applicable settings on a host in order to project the system resources that will be available to an application during its subsequent execution with an ever changing network.

In contrast, an ideal NMS solution would be able to provide some level of data from each segment in the monitored network irrespective of the network's size and topological configuration. It should not require special dedicated probe devices to exist on every segment, but should be capable of using such devices on segments where they are present. Detailed traffic data should not be collected from a segment unless the segment has potential problems or is among the most likely segments in the network to experience problems.

Each segment has certain relatively static characteristics that determine its susceptibility to problems, and the monitoring solution should combine these with dynamic conditions monitored on each segment to determine which should have detailed information extracted from them. An ideal solution should not require installation on a powerful or even dedicated host system to provide acceptable performance, but should be able to take advantage of the increased resources that are available to it when executing on such systems. Finally, the solution should be scalable so that it continues to operate effectively and provides useful information as the monitored network evolves over time.

The present invention specifies an operational adapter for interacting with an NMS application to provide the ideal NTAS application solution described above. In general, the inventive NTAS application utilizes a PDU credit limit to bound an NTAS application's consumption of host system resources. This adapter allows a conventional NMS application to behave as a "good citizen" on every host where it executes. The PDU credit limit can be selected arbitrarily, based on an inspection of the host system's configuration, or established by empirical measurement of the host systems capabilities. When the PDU credit limit is assigned in an intelligent manner, rather than being defaulted to the same value for each host system, it can provide a guideline that prevents an NTAS application from oversubscribing its host system's resources.

The inventive NTAS applications can adapt their behavior to adhere to a PDU credit limit by changing the type of traffic data gathered from network segments. For example, an application might gather some traffic data from all segments but collect more detailed data on those segments that are the most susceptible to problems. This allows the NTAS application to function on hosts of widely differing capabilities. On less capable hosts, a lower PDU credit limit can be assigned and the application will reduce its use of system resources by collecting detailed traffic information form fewer segments. The same mechanism will also allow the same application running on identical hosts, and adhering to identical PDU credit limits, to function ably in networks whose number of segments differ greatly. The application will simply collect detailed traffic information from fewer segments in the larger of the networks.

This invention suggests, but does not require that the type of traffic data collected pervasively be counter tallies, a mechanism that is readily available on almost every managed network device. For situations in which an application can only collect detailed traffic information from a subset of segments in the monitored network because of its PDU credit limit, the concept of periodically adjusting the set of segments to ensure that the most important ones are monitored is encouraged.

This invention is unique in offering a means for applications to monitor every segment of a network while considering the consumption of resources on the application's host system. In summary, the operational adapter of the present invention provides a reliable, efficient, and effective way to utilize a conventional network management system to obtain tangible data from any desired data acquisition method of a network while maintaining optimal host operability. In other words, the present invention provides a network traffic analysis system that can collect traffic information from a wide spectrum of network types and sizes while ably functioning on host computer systems of vastly disparate capabilities.

What is claimed is:

1. A process for adapting the operation of a network management system to optimize the operational relationship between the host computer and the coupled network, the process comprising:

survey the network to establish segments of nodes within the network;

prioritize said segments of nodes from a highest to a lowest importance for the system to manage;

retrieve and organize said segments of nodes into lists, each one of said lists having a distinct traffic data acquisition method;

prioritize said lists from a highest to a lowest importance for the system to manage;

acquire a protocol data unit ("PDU") credit limit for regulating the amount of traffic information obtained from the prioritized segments;

apportioning said PDU credit limit amongst the highest prioritized list of said lists;
determine the remaining PDU credit limit available after the step of apportioning; and
apportioning said remaining PDU credit limit amongst the next highest prioritized lists of said lists one segment at a time until said remaining PDU credit limit is similar to zero.

2. The process of claim 1, further including acquire an analysis period for regulating the amount of time that can be expended to collect traffic information from said prioritized segments.

3. The process of claim 2, further including establishing a retrieval period being less than said analysis period for collecting traffic information from at least one of said lists.

4. The process of claim 3, further including adjusting the duration of said retrieval period to provide enough time to collect traffic information from said lists within said analysis period.

5. The process of claim 3, further including establishing a frequency for collecting traffic information from each one of said prioritized segments within said retrieval period.

6. The process of claim 3, further including adjusting said frequency to provide enough time to collect traffic information from each one of said prioritized segments within said retrieval period.

7. The process of claim 1, further including apportioning said PDU credit limit among said prioritized segments of nodes to determine the number of prioritized segments that can exchange traffic information without exceeding said PDU credit limit.

8. The process of claim 1, further including prioritize the nodes of each one of said segments of nodes within each one of said lists from a highest to a lowest importance for the system to manage.

9. The process of claim 1, wherein said step of survey further includes categorize said segments of nodes into lists of segments having a different network topology characteristic selected from the group including network communication technology, data acquisition method, number of nodes, and device types.

10. A network traffic analysis system operable on a host computer being coupled to a network, said network having multiple segments that may utilize various data acquisition methods, the system comprising:
a network organizer that categorizes the multiple segments of the network;
a protocol data unit ("PDU") distributor that determines the number of PDUs necessary to obtain traffic information form one of said multiple segments;
a network prioritizer that ranks said categorized segments amongst themselves according to a necessity to obtain data traffic information for analysis; and
a system optimizer that determines how many of the ranked segments can provide data traffic information without exceeding a set PDU credit limit by an apportioning element that subtracts said determined number of PDUs for each prioritized segment from said PDU credit limit until the value of the PDU credit limit is similar to zero.

11. The system of claim 10, wherein said network organizer categorizes said multiple segments into lists of segments according to the data acquisition method that the associated segments use for obtaining network traffic information.

12. The system of claim 11, wherein said network prioritizer further includes a segment prioritizer that ranks said segments of each one of said multiple segment lists among one another according to a highest to lowest importance to collect traffic information.

13. The system of claim 11, wherein said system optimizer further includes a duplicate node eliminator that ignores a segment of at least one of said lists of segments that can be found in another one of said lists of segments having a higher ranking.

14. The system of claim 11, wherein said system optimizer further includes a utilization element to determine which of said multiple segments should provide detailed traffic information according to previously collected basic traffic information.

15. The system of claim 11, wherein said network prioritizer further includes a segment prioritizer that ranks the nodes within each one of said multiple segment lists according to a highest to lowest importance to collect traffic information.

16. The system of claim 10, wherein said network organizer categorizes said multiple segments into lists of segments according to at least one network topology characteristic selected from the group including network communication technology, data acquisition method, number of nodes, and device types.

17. The system of claim 10, wherein said network prioritizer ranks the nodes of each categorized segment according to a necessity to obtain data traffic information for analysis.

18. The system of claim 10, wherein said PDU credit limit dictates an optimal operating condition for the host computer to communicate with the network and any software or device associated therewith.

19. The system of claim 10, wherein said PDU credit limit is an arbitrary value selected by the user.

20. The system of claim 10, wherein said PDU credit limit being related to the operational characteristics of the hardware and software of the host computer while interacting with an active network to optimize system resources.

21. The system of claim 10, wherein said system optimizer further includes a frequency element that adjusts the number of times traffic information is collected from each one of said ranked segments to avoid exceeding said PDU credit limit.

22. The system of claim 10, wherein said system optimizer further includes collection timer that adjusts a retrieval period for collecting traffic information from each one of said ranked segments to avoid exceeding said PDU credit limit.

23. A computer readable storage medium tangibly embodying programmed instructions to implementing a method for adapting the operation of a network management system to optimize the operational relationship between a host computer, the programmed instructions, and a coupled network, said method comprising:
categorize the multiple segments of the network by organizing said segments into lists of segments according to the data acquisition method used to obtain network traffic information;
rank said categorized segments amongst themselves according to a necessity to obtain data traffic information for analysis and mark to ignore any duplicate segments from said lists; and
determine how many of the ranked segments can provide data traffic information without exceeding a set protocol data unit ("PDU") credit limit.

24. The method of claim 23, wherein said step of rank further includes prioritize said categorized lists amongst themselves according to a necessity to obtain data traffic information for analysis.

25. The method of claim 24, wherein said step of rank further includes prioritize the nodes of each one of said categorized segments according to a necessity to obtain data traffic information for analysis.

26. The method of claim 23, wherein said step of rank further includes determining the number of PDUs necessary to obtain traffic information from each one of said multiple segments.

27. The method of claim 26, wherein said step of determining further includes subtracting said determined number of PDUs for each prioritized segment from said PDU credit limit until the value of the PDU credit limit is similar to zero.

28. The method of claim 23, wherein said step of categorize further includes organizing said multiple segments into lists of segments according to at least one network topology characteristic selected from the group including network communication technology, data acquisition method, number of nodes in segment, and device types.

29. The method of claim 23, wherein said step of determining further includes adjusting the number of times traffic information is collected from each one of said ranked segments to avoid exceeding said PDU credit limit.

30. The method of claim 23, wherein said step of determining further includes adjusting a retrieval period for collecting traffic information from each one of said ranked segments to avoid exceeding said PDU credit limit.

31. The method of claim 23, further including a step of determining which of said multiple segments should provide detailed data traffic information according to previously collected basic traffic information.

32. The method of claim 23, wherein said step of determining further includes establishing how many of the ranked segments from a highest to lowest importance for the system to manage can provide detailed data traffic information without exceeding said set PDU credit limit.

33. The method of claim 23, wherein said step of determining further includes calculating how many of the ranked segments can provide detailed traffic information after the highest priority list provides data traffic information without exceeding said set PDU credit limit.

34. A network traffic analysis system operable on a host computer being coupled to a network, said network having multiple segments that may utilize various data acquisition methods, the system comprising:

a network organizer that categorizes the multiple segments of the network into lists of segments according to the data acquisition method that the associated segments use for obtaining network traffic information;

a network prioritizer that ranks said categorized segments amongst themselves according to a necessity to obtain data traffic information for analysis;

a system optimizer that determines how many of the ranked segments can provide data traffic information without exceeding a set protocol data unit ("PDU") credit limit; and a duplicate node eliminator that ignores a segment of at least one of said lists of segments that can be found in another one of said lists of segments having a higher ranking.

35. A network traffic analysis system operable on a host computer being coupled to a network, said network having multiple segments that may utilize various data acquisition methods, the system comprising:

a network organizer that categorizes the multiple segments of the network into lists of segments according to the data acquisition method that the associated segments use for obtaining network traffic information;

a network prioritizer that ranks said categorized segments amongst themselves according to a necessity to obtain data traffic information for analysis;

a system optimizer that determines how many of the ranked segments can provide data traffic information without exceeding a set protocol data unit ("PDU") credit limit; and a utilization element to determine which of said multiple segments should provide detailed traffic information according to previously collected basic traffic information.

36. A computer readable storage medium tangibly embodying programmed instructions to implementing a method for adapting the operation of a network management system to optimize the operational relationship between a host computer, the programmed instructions, and a coupled network, said method comprising categorize the multiple segments of the network;

rank said categorized segments amongst themselves by determining the number of protocol data units ("PDU") necessary to obtain traffic information from each one of said multiple segments; and determine how many of the ranked segments can provide data traffic information without exceeding a set PDU credit limit by subtracting said determined number of PDUs for each prioritized segment from said PDU credit limit until the value of the PDU credit limit is similar to zero.

* * * * *